(12) United States Patent
Bender

(10) Patent No.: US 9,492,714 B2
(45) Date of Patent: *Nov. 15, 2016

(54) METHOD AND KIT FOR CUSTOMIZING A GOLF BALL

(75) Inventor: Aaron Bender, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 713 days.

This patent is subject to a terminal disclaimer.

(21) Appl. No.: 13/436,070

(22) Filed: Mar. 30, 2012

(65) Prior Publication Data

US 2013/0256321 A1 Oct. 3, 2013

(51) Int. Cl.
A63B 37/02 (2006.01)
A63B 37/00 (2006.01)
B65D 77/00 (2006.01)
B29C 35/02 (2006.01)
B29C 35/16 (2006.01)
B65D 75/36 (2006.01)
(Continued)

(52) U.S. Cl.
CPC ....... A63B 37/0003 (2013.01); A63B 37/0074 (2013.01); A63B 43/00 (2013.01); A63B 43/008 (2013.01); A63B 45/00 (2013.01); A63B 47/00 (2013.01); A63B 69/3655 (2013.01); A63B 69/3688 (2013.01); B29C 35/02 (2013.01); B29C 35/0805 (2013.01); B29C 35/16 (2013.01); B29C 45/14819 (2013.01); B29C 71/02 (2013.01); B65D 75/367 (2013.01); B65D 77/00 (2013.01); A63B 37/0051 (2013.01); A63B 37/0075 (2013.01); A63B 37/0076 (2013.01); A63B 47/005 (2013.01); A63B 2225/60 (2013.01); B29C 2035/0855 (2013.01); B29C 2035/165 (2013.01); B29C 2035/1616 (2013.01); B29C 2071/025 (2013.01); B29L 2031/546 (2013.01); B65D 2203/00 (2013.01)

(58) Field of Classification Search
CPC .. B65D 77/00; B65D 2203/00; A63B 37/02; A63B 43/00; A63B 55/20
USPC .............. 206/223, 315.9, 776, 778; 264/236, 264/237, 250, 255, 347, 348
See application file for complete search history.

(56) References Cited

U.S. PATENT DOCUMENTS 3,989,568 A 11/1976 Isaac
5,413,332 A 5/1995 Montgomery
(Continued)

OTHER PUBLICATIONS

U.S. Appl. No. 13/341,374 entitled "Method and Kit for Customizing a Golf Ball," filed Mar. 30, 2012.
(Continued)

Primary Examiner — Andrew Perreault
(74) Attorney, Agent, or Firm — Honigman Miller Schwartz and Cohn LLP

(57) ABSTRACT

A method and system for making a golf ball core is disclosed. The method may generally include forming a golf ball core out of a raw core material. The golf ball core may be rapidly heated to begin curing (or vulcanizing) from the outermost surface toward the center of the golf ball core. Before curing the entire golf ball core, the golf ball core may be quenched to stop the curing process. As a result, the golf ball core may include an outer cured zone and an inner uncured zone. In this state, the golf ball core may be incorporated into a finished golf ball to be sold to consumers. Following a set of instructions provided with the golf ball, the consumer may heat the golf ball and a cure indicator to customize the properties of the golf ball core, and, thus, the characteristics of the golf ball.

12 Claims, 7 Drawing Sheets

| HEATING PROCESS | COOLING PROCESS | RUBBER PLAQUE COLOR | SPIN | PLAY CHARACTERISTICS ACHIEVED |
|---|---|---|---|---|
| OUT OF BOX | N/A | RED | MEDIUM | LONGEST DISTANCE |
| MICROWAVE ON HIGH POWER FOR 1 MINUTE | COOL AT ROOM TEMPERATURE FOR 30 MINUTES | ORANGE | MEDIUM | LONGER DISTANCE |
| MICROWAVE ON HIGH POWER FOR 2 MINUTE | ICE BATH FOR 1 TO 5 MINUTES | LIGHT ORANGE | HIGHER | MORE CONTROL |
| MICROWAVE ON HIGH POWER FOR 2 MINUTE | COOL AT ROOM TEMPERATURE FOR 30 MINUTES | WHITE | HIGHEST | MOST CONTROL |

(51) Int. Cl.
*B29C 71/02* (2006.01)
*B29C 35/08* (2006.01)
*B29C 45/14* (2006.01)
*A63B 43/00* (2006.01)
*A63B 45/00* (2006.01)
*A63B 69/36* (2006.01)
*A63B 47/00* (2006.01)
*B29L 31/54* (2006.01)

(56) References Cited

U.S. PATENT DOCUMENTS

| | | | |
|---|---|---|---|
| 5,542,677 A * | 8/1996 | Sullivan et al. | 473/385 |
| 5,795,247 A * | 8/1998 | Yokota et al. | 473/374 |
| 5,810,677 A * | 9/1998 | Maruko et al. | 473/357 |
| 6,180,040 B1 | 1/2001 | Ladd et al. | |
| 6,180,722 B1 | 1/2001 | Dalton et al. | |
| 6,207,095 B1 * | 3/2001 | Gosetti | 264/250 |
| 6,936,205 B2 | 8/2005 | Cavallaro et al. | |
| 7,819,761 B2 | 10/2010 | Kim et al. | |
| 8,235,880 B2 * | 8/2012 | Guier | 206/315.9 |
| 2004/0238388 A1 * | 12/2004 | Snell | 206/315.9 |
| 2007/0227943 A1 * | 10/2007 | Foushee | 206/775 |
| 2008/0081710 A1 | 4/2008 | Chen et al. | |
| 2008/0273911 A1 | 11/2008 | Gueret | |
| 2011/0053707 A1 | 3/2011 | Ishii et al. | |
| 2011/0095012 A1 | 4/2011 | Cheng | |
| 2011/0177890 A1 | 7/2011 | Tutmark | |
| 2012/0077621 A1 | 3/2012 | Ishii et al. | |
| 2012/0214615 A1 | 8/2012 | Ishii et al. | |

OTHER PUBLICATIONS

U.S. Appl. No. 13/779,515 entitled "Golf Ball Core and Method of Making a Golf Ball Core," filed Feb. 2, 2013.

\* cited by examiner

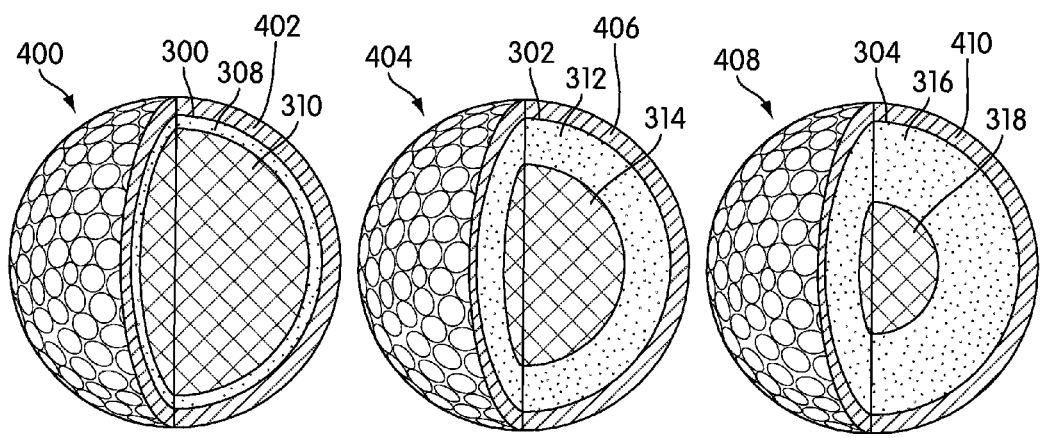
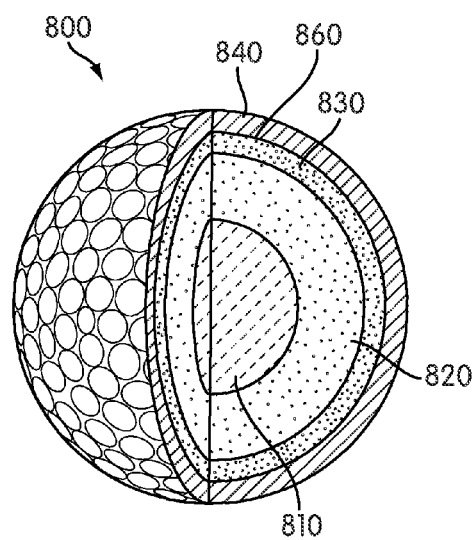
FIG. 7
FIG. 8

| HEATING PROCESS | COOLING PROCESS | RUBBER PLAQUE COLOR | SPIN | PLAY CHARACTERISTICS ACHIEVED |
|---|---|---|---|---|
| OUT OF BOX | N/A | RED | MEDIUM | LONGEST DISTANCE |
| MICROWAVE ON HIGH POWER FOR 1 MINUTE | COOL AT ROOM TEMPERATURE FOR 30 MINUTES | ORANGE | MEDIUM | LONGER DISTANCE |
| MICROWAVE ON HIGH POWER FOR 2 MINUTE | ICE BATH FOR 1 TO 5 MINUTES | LIGHT ORANGE | HIGHER | MORE CONTROL |
| MICROWAVE ON HIGH POWER FOR 2 MINUTE | COOL AT ROOM TEMPERATURE FOR 30 MINUTES | WHITE | HIGHEST | MOST CONTROL |

FIG. 9

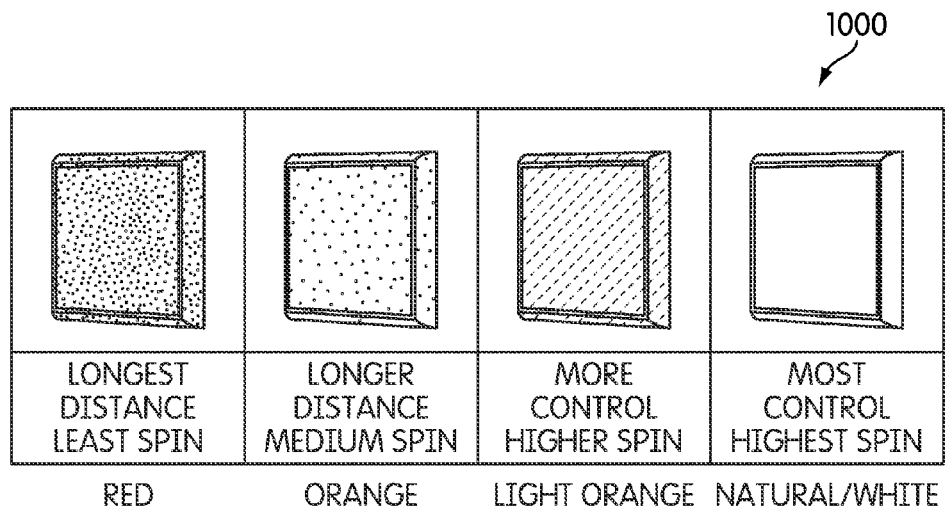

FIG. 10

METHOD AND KIT FOR CUSTOMIZING A GOLF BALL

BACKGROUND

The present disclosure relates generally to a method of customizing the play characteristics of a golf ball. In addition, the present disclosure relates to a kit of parts for customizing the play characteristics of a golf ball.

The game of golf is an increasingly popular sport at both the amateur and professional levels. A wide range of technologies related to the manufacture and design of golf balls are known in the art. Such technologies have resulted in golf balls with a variety of play characteristics. For example, different golf balls are manufactured and marketed to players having different golfing abilities, such as different swing speeds.

Similarly, a golfer may use different golf balls having different play characteristics depending on the golfer's preferences. For example, different dimple patterns may affect the aerodynamic properties of the golf ball during flight, or a difference in the hardness may affect the rate of backspin. With regard to hardness in particular, a golfer may choose to use a golf ball having a cover layer and/or a core that is harder or softer. A harder golf ball will generally achieve greater distance but less spin, and so will be better for drives but more difficult to control on shorter shots. On the other hand, a softer golf ball will generally experience more spin and therefore be easier to control, but will lack distance.

The manner in which golf balls are made contributes to the play characteristics of the golf ball as well. Balls having a solid construction are generally most popular with the average recreational golfer because they provide a very durable ball while also providing maximum distance. Solid balls may comprise a single solid core encased within a cover material that provides a tough, cut-proof blended cover, and often are referred to as "two-piece" golf balls. Such a combination of a single solid core and a cut-proof cover may impart a high initial velocity that results in improved distance in such two-piece golf balls. But the materials used in such two-piece golf balls may be very rigid. As a result, two-piece balls may, depending upon the construction, have a hard "feel" when struck with a club. Likewise, due to their hardness, these two-piece balls may have a relatively low spin rate, which, while providing greater distance, may sometimes be more difficult to control, for example, when hitting an approach shot to the green.

Additionally, the spin rates of golf balls affect the overall control of the balls in accordance with the skill level of the players. Low spin rates provide improved driver and long-iron distance, but make golf balls difficult to stop on shorter shots, such as approach shots to greens. High spin rates allow more skilled players to maximize control of the golf ball, but may adversely affect driving and long-iron distance. To strike a balance between the spin rates and the playing characteristics of golf balls, additional layers, such as intermediate layers, outer core layers and inner cover layers are added to solid golf balls to change the playing characteristics of the ball. The addition of multiple layers may add to the complexity of the manufacturing process as well as to the expense of manufacturing a golf ball.

While a variety of types of golf balls exist for different play characteristics, amateur golfers generally prefer to minimize the costs of purchasing new golf balls. However, a golfer may be required to purchase several sets of golf balls in order to achieve different play characteristics. For example, a golfer may purchase and use a set of hard golf balls for use specifically on longer courses, when the improved distance achieved by hard golf balls will be advantageous. In addition, a golfer may purchase and use a set of soft golf balls for use on shorter courses, or for use under conditions requiring increased control such as cold or wet weather. The need to purchase, store and carry several sets of golf balls in order to achieve a variety of play characteristics presents an inconvenience to the golfer, as well as increased costs.

In addition, manufacturing golf balls having more than two pieces, i.e., three-piece or four-piece golf balls, can prove time consuming and more expensive than manufacturing a two-piece golf balls. However, a golfer may desire the advantages provided by three-piece and four-piece golf balls, such as higher spin rates to maximize control of the golf ball, while maintaining driver and long-iron distance. Developing a method of manufacturing a two piece golf ball that could provide the benefits of a three-piece or four-piece golf ball could reduce both manufacturing time and the associated expenses of equipment and materials.

Therefore, there is a need in the art for a system and method that addresses the shortcomings of the prior art discussed above.

SUMMARY

A method and system for making a golf ball core is disclosed. Embodiments of the disclosure generally include forming a golf ball core out of a raw core material. The golf ball core may be rapidly heated to begin curing (or vulcanizing) from the outermost surface toward the center of the golf ball core. Before the entire golf ball core is cured, the golf ball core may be quenched to stop the curing process. As a result, the golf ball core may include an outer cured zone and an inner uncured zone. In this state, the golf ball core may be incorporated into a finished golf ball to be sold to consumers.

One or more cure indicators are also disclosed. The cure indicator may be formed from the same rubber material as the golf ball core. The cure indicator may also include a pigment. The cure indicator may be a rubber plaque. At least one cure indicator is included with the finished golf ball sold to consumers. Following a set of instructions provided with the finished golf ball, the consumer may heat the golf ball, along with the cure indicator, to customize the properties of the golf ball core, and, thus, the characteristics of the golf ball. The set of instructions further includes a color indicator chart to compare with the color of the cure indicator during heating for determining the desired play characteristics achieved by heating the golf ball core.

In one aspect, the disclosure provides a method of customizing a golf ball. Embodiments of the disclosure include heating a golf ball core to cure at least a portion of the golf ball core and rapidly quenching the golf ball core before the golf ball core finishes curing throughout the entire golf ball core such that a portion of the golf ball core is left uncured. Embodiments of the disclosure also include incorporating the golf ball core into a finished golf ball by applying at least one cover layer. The uncured portion of the golf ball core may remain uncured after the golf ball core is incorporated into the finished golf ball. In some embodiments, a cure indicator of the raw core material also is formed.

Embodiments of the disclosure include heating the finished golf ball. Embodiments of the disclosure include heating the finished golf ball and the cure indicator. Heating the golf ball core to cure at least a portion of the golf ball core includes compression molding the golf ball core. Compression molding at least one slug of core material may include heating a mold to about 400° F. In some embodiments, compression molding at least one slug of core material may include heating a mold to 460° F.

Heating the finished golf ball and/or cure indicator may include heating the finished golf ball in a microwave. Heating the finished golf ball and/or cure indicator may include heating the finished golf ball in an oven. Heating the golf ball core and/or cure indicator to cure at least a portion of the golf ball core includes heating the golf ball core to a temperature ranging from about 300° F. to about 500° F. Heating the golf ball core and/or cure indicator may include heating the golf ball core until a cure indicator has reached a specific color to indicate the desired play characteristics of the finished golf ball.

Embodiments of the disclosure include quenching the finished golf ball. Embodiments of the disclosure include quenching the finished golf ball. Rapidly quenching the golf ball core may include quenching the golf ball core in an ice bath, a water bath, a cryogenic fluid bath, a dry ice/alcohol bath, or a cold chamber.

In one aspect, the disclosure provides a method of customizing a golf ball. Embodiments of the disclosure include providing a golf ball to a consumer. The golf ball may include a cover layer surrounding a core having at least a cured zone and an uncured zone. Embodiments of the disclosure include providing a cure indicator to a consumer.

In one aspect, embodiments of the disclosure include indicating to the consumer to heat the golf ball and cure indicator to a preselected temperature, and then quench the golf ball and cure indicator so as to cause the golf ball to exhibit a desired play characteristic when hit with a golf club. Indicating to the consumer to heat the golf ball may include indicating to the consumer to microwave the golf ball at a preselected power for a preselected length of time. Indicating to the consumer to heat the golf ball may include indicating to the consumer to heat the golf ball and a cure indicator simultaneously until the cure indicator reaches a desired color indicating a specific cure level for the golf ball core. Indicating to the consumer to heat the golf ball may include indicating to the consumer to heat the golf ball and cure indicator in an oven preheated to a preselected temperature for a preselected length of time.

In other aspects, embodiments of the disclosure include indicating to the consumer to quench the golf ball may include indicating to the consumer to quench the golf ball in a bath of water. Indicating to the consumer to quench the golf ball may include indicating to the consumer to quench the golf ball in a bath of ice and water. Embodiments of the disclosure include indicating to the consumer to quench the golf ball to cause the golf ball to exhibit a desired play characteristic when hit with a golf club.

In one aspect, the disclosure provides a method of customizing a golf ball. Embodiments of the disclosure include forming a golf ball core by compression molding at least one slug of core material into a golf ball core. The core material may begin to cure during compression molding. Embodiments of the disclosure include quenching the golf ball core in a fluid to halt the curing of the core material. Embodiments of the disclosure include covering the golf ball core with a cover layer to form a finished golf ball. The cover layer may include a microwave transparent cover. Embodiments of the disclosure include providing the finished golf ball to a consumer. Embodiments of the disclosure include providing a cure indicator to a consumer.

Embodiments of the disclosure include indicating to a consumer to heat the finished golf ball and cure indicator to a preselected temperature to cause the finished golf ball to exhibit a desired play characteristic when hit with a golf club. Embodiments of the disclosure include indicating to a consumer to heat the finished golf ball and a cure indicator until the cure indicator reaches a specific color indicating a specific cure level for the golf ball core. The cure indicator may be enclosed in a transparent container that is also microwave transparent.

In one aspect, the disclosure provides a kit of parts. The kit may include at least one golf ball including a cover layer surrounding a core having a cured zone and an uncured zone, one or more cure indicators enclosed in a transparent container, and an indicator legend illustrating 3 or more color levels for the cure indicator to indicate the level of cure achieved for the golf ball core and the desired play characteristics that are associated with a specific cure level. The kit may include a set of instructions indicating to a consumer to heat the golf ball and cure indicator to a preselected temperature, and then quench the golf ball so as to cause the golf ball to exhibit a desired play characteristic when hit with a golf club. The kit may include a set of instructions indicating to a consumer to heat the golf ball and the cure indicator until a preselected color is achieved, and then quench the golf ball so as to cause the golf ball to exhibit a desired play characteristic when hit with a golf club. The kit of parts may include a stand for holding the golf ball. The uncured zone may include an inner core zone and the cured zone includes an outer core zone surrounding the inner core zone.

In one aspect, the disclosure provides a golf ball. The golf ball may have a core having at least a cured zone and an uncured zone. The golf ball may also have a cover layer surrounding the core. The cured zone may surround the uncured zone. Both the cured zone and the uncured zone may be made of the same starting rubber material. Both the cured zone and the uncured zone may include a highly conjugated pigment.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 shows the three finished golf balls of FIG. 4 after undergoing a heating and quenching process;

FIG. 8 discloses a finished golf ball having a core including three distinct regions;

FIG. 9 shows a chart that may be included in the kit of FIG. 5; and

FIG. 10 is a chart that may be included in the kit of FIG. 5 that shows the correlation between the cure indicator color and the finished golf ball play characteristics.

DETAILED DESCRIPTION

Generally, the present disclosure provides methods for customizing a golf ball, and, in particular, customizing the hardness of a golf ball core, and associated kits that may be used to carry out the methods.

Figure 1:
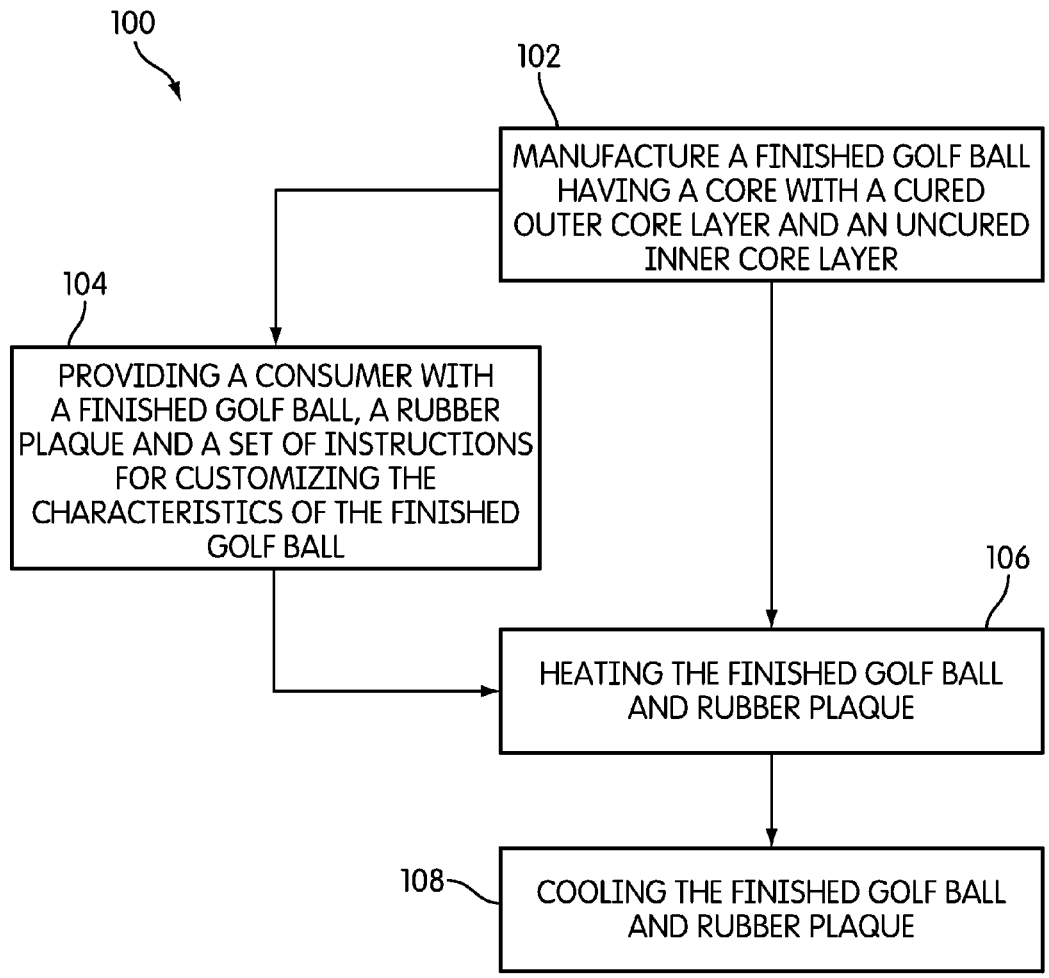
FIG. 1 is a flowchart showing a method of customizing a golf ball according to an embodiment.

FIG. 1 is a flowchart showing the overall process 100 by which a golf ball may be customized. Process 100 includes first step 102 relating to the manufacturing of a finished golf ball that has a core with a cured outer core zone and an uncured inner core zone. Further, process 100 includes second step 104 relating to providing a consumer with a finished golf ball, at least one cure indicator, and a set of instructions for customizing the characteristics of the finished golf ball. Process 100 also includes third step 106 relating to heating the finished golf ball and cure indicator. Finally, process 100 includes further step 108 relating to quenching the finished golf ball. The steps of process 100 allow the consumer to customize the finished golf ball to exhibit the consumer's desired play characteristics when hit with a golf club.

Step 102 may include manufacturing a finished golf ball having a core with a cured outer core zone and an uncured inner core zone. A finished golf ball is a golf ball that includes all layers and components necessary for the golf ball to be used by a golfer in a game of golf. The finished golf ball may be a two-piece ball, having a core and a cover layer. The finished golf ball may include any number of layers, so long as the golf ball includes at least a core having two or more core zones and at least one cover layer substantially disposed around the core.

Step 104 may include providing a consumer with a finished golf ball, a cure indicator, and a set of instructions for customizing the characteristics of the finished golf ball. In some embodiments, step 104 may be performed before step 106. In other embodiments, step 104 may be omitted and step 102 may be performed directly before step 106. Generally, step 106 and step 108 may be performed by a party other than the party responsible for manufacturing the golf ball. The golf ball may thereby undergo aftermarket customization. The customization may be performed by anyone post-manufacture, such as the end-user him or herself, or by (for example) a golf pro at a golf pro shop.

Step 106 may include heating the finished golf ball and the cure indicator to a preselected temperature. The preselected temperature may be any temperature that delivers sufficient heat energy to cause crosslinking within the uncured inner core zone and the cure indicator. The exact value of this temperature may depend on the type of material used in the golf ball core.

The heating may cure the uncured inner core zone causing the inner core zone to increase in hardness. The desired hardness of the golf ball core may be selected by the end-user consumer golfer, or by another person such as a golf pro, so that the golf ball will achieve desired play characteristics. For example, if the golfer intends to play in colder weather, the golfer may select a lower hardness as the desired hardness.

In some embodiments, the preselected temperature may be built into the steps of a heating process. In other words, instead of aiming to achieve a certain preselected temperature, an end-user consumer golfer may follow certain heating steps that may lead to a preselected temperature. For example, an end-user consumer golfer may microwave a finished golf ball on high power for 1 minute. While this process may raise the temperature of the finished golf ball to the preselected temperature, the end-user consumer golfer may not be aware of the preselected temperature. The specific microwaving process may achieve the preselected temperature. Thus, step 106 may include a process that heats the golf ball to a preselected temperature without a user knowing the preselected temperature.

In some embodiments, achieving the preselected temperature in step 106 is indicated by the color change of the cure indicator heated along with the finished golf ball. The rubber material that forms the cure indicator may include a highly conjugated pigment. The highly conjugated pigment provides a specific color to the rubber material when the rubber is uncured. As the rubber material is cured, the color of the rubber material changes. When the rubber material is fully cured, the cured rubber material again is the color of the uncured rubber material without any pigment.

In some embodiment, the rubber material of golf ball core may include a highly conjugated pigment. In those embodiments where a highly conjugated pigment is included in the rubber material of the golf ball core, the other components of the rubber are adjusted to ensure the rubber material properly cures to the desired level. For example, the concentration of a free radical initiator and a co-curing agent may be adjusted. The concentrations are adjusted to ensure that not only does the color of the rubber material changes during the curing process but that the rubber material cures properly to the desired cure level.

Although the inventors do not wish to be bound to theory, it is believed that the color change takes place due to a reaction between the highly conjugated pigment and a crosslinking/curing agent, such as a free radical initiator. The free radical initiator included in the rubber not only cross-links the rubber materials, but also cleaves or breaks down the highly conjugated pigments. When the conjugation of the pigment is broken down to fewer than 8 conjugated double bonds in length, the pigment is no longer visible to the human eye. Accordingly, as the pigment starts to break down in the rubber during step 106, the color of the rubber material changes. The change in color of the rubber material may indicate the level of cure achieved for the golf ball core.

In some embodiments, beta-carotene is included in the rubber materials of the cure indicator which may provide a yellow, orange or red color to uncured rubber, depending on the color of the starting rubber material as well as the amount of pigment include in the material. As the rubber material with a free radical initiator is cured in step 106, the initiator cross-links the rubber material as well as breaks down the length of the conjugation of the pigment. As the length of the conjugation of the pigments becomes smaller, the intensity of the color of the pigments is lessened. For example, as the rubber material cures during step 106, the color of the rubber material changes for a red color to an orange color. In some embodiments, as the rubber material continues to cure during step 106, the color may also continue to change from orange to light orange.

When the rubber is fully cured, the pigment may not be providing any color to the rubber materials, leaving the rubber material in its natural color. In other words, if the rubber material is naturally white, the addition of a highly conjugated pigment, such as beta-carotene, may initially provide a deep red color, depending on the amount of pigment added to the rubber material. As the rubber material is cured, the color of the rubber material changes from red to orange, then from orange to light orange, from light orange to yellow, and finally from yellow to white during the curing process. See Table 1 below for additional examples. Each color change is indicative of a specific level of cure achieved. In turn, the specific level of cure achieved is indicative of specific play characteristics the finished golf ball will exhibit when hit with a golf club.

TABLE 1

| Rubber Material Color | Pigment Color | Rubber Material with Pigment Color | Early Mid-Cure Color | Late Mid-Cure Color | Fully Cured Rubber |
|---|---|---|---|---|---|
| White | Sudan Black B | Black | Purple | Light Purple | White |
| Red | Aniline Yellow | Light Orange | Orange | Light Red | Red |
| White | Oil Red O | Red | Dark Pink | Light Pink | White |
| White | Chlorophyl A | Dark Green | Green | Light Green | White |
| Yellow | Azulene | Dark Green | Grey Green | Green | Yellow |
| Light Green | Beta-carotene | Brown | Light Brown | Green | Light Green |
| White | Phenol Red | Red | Pink | Light Pink | White |
| White | Indigo | Dark Blue | Blue | Light Blue | White |
| White | Erythrosine | Dark Pink | Pink | Light Pink | White |
| White | Beta-carotene and Azulene | Purple | Orange | Light Orange | White |
| White | Chlorophyll A and Aniline Yellow | Green | Yellow | Light Yellow | White |
| Blue | Phenol Red and Aniline Yellow | Orange | Purple | Light Purple | Blue |

In some embodiments, the preselected temperature may correspond to a specific color for the cure indicator in a gradient chart. The end user will visually see that the selected cure temperature has been achieved when the cure indicator reaches the desired color on the color gradient chart. The color achieved corresponds to a specific level of cure for the golf ball core. The specific level of cure further corresponds to specific play characteristics for the finished golf ball.

Step 108 may include quenching the finished golf ball and/or the cure indicator to halt the curing process. The golf ball and cure indicator may be quenched at a preselected rate that corresponds to the selected desired hardness. The preselected rate may control the degree of crosslinking occurring in the inner core zone. The core material may have a low thermal conductivity causing the golf ball core to hold heat long enough to fully cure any uncured regions of the golf ball core. The faster the golf ball core is quenched, the sooner the crosslinking is halted. Thus, the rate at which the curing of the golf ball core is halted may control the degree of crosslinking.

Figure 2:
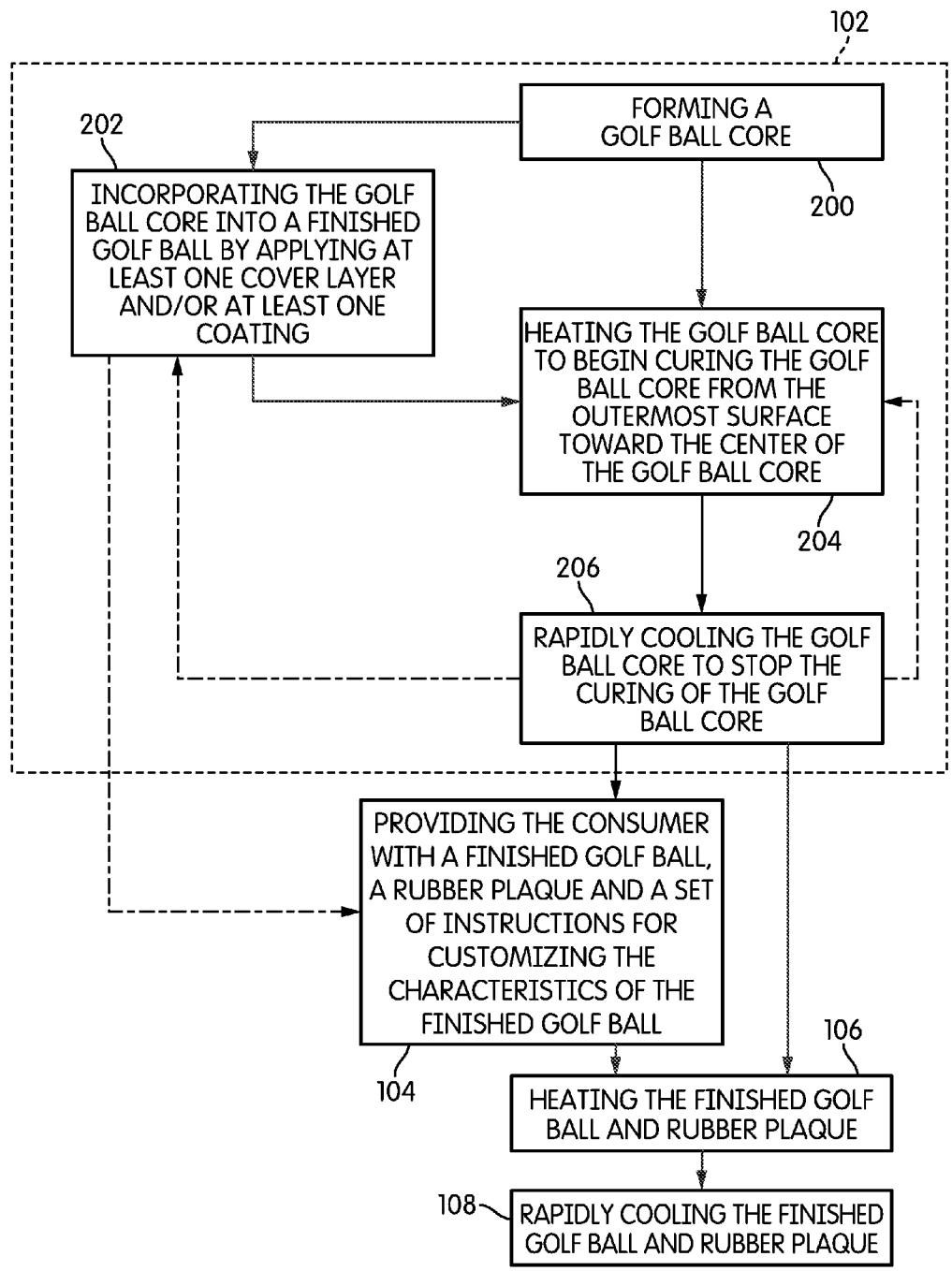
FIG. 2 is a flowchart showing details of the method of FIG. 1.

FIG. 2 is a flowchart showing step 102 in greater detail. Step 200 may include forming a golf ball core. Step 200 may be performed by any known method. For example, in some embodiments, the golf ball core may be molded. The method of forming the golf ball core may be selected based on a variety of factors. For example, the method may be selected based on the type of core material used to make the golf ball core and/or the desired size of the golf ball core.

Step 204 may include heating the golf ball core to begin curing the golf ball core from the outermost surface toward the center of the golf ball core. In some embodiments, step 200 may be performed together with step 204 simultaneously. For example, in some embodiments, step 200 may include compression molding a golf ball core. Compression molding involves using a mold to heat and press at least one slug of unmolded core material into a golf ball core. The heat applied during compression molding may cause the golf ball core to begin to cure from the outermost surface toward the center of the golf ball core. In some embodiments, the golf ball core may be compression molded at a temperature ranging from 300° F. to 500° F. For example, the golf ball core may be compression molded at a temperature of 400° F. In some embodiments, the golf ball core may be compression molded at a temperature of 460° F. In some embodiments, the compression molding may last for one to four minutes. The temperature and duration of the compression molding process may be selected based upon, for example, the desired thickness of the cured portion of the golf ball core and/or the desired degree of crosslinking. With the guidance provided herein, the skilled practitioner will scale the temperature to select the level of cure or hardness for the golf ball core.

Step 202 may include incorporating the golf ball core into a finished golf ball by applying at least one cover layer and/or at least one coating. In step 202, the at least one cover layer may be applied to the golf ball core by any suitable method. For example, in some embodiments, the at least one golf ball cover layer may be applied to the golf ball core with adhesive and pressure. In some embodiments, the cover layer may be applied to the golf ball core by injection molding. During injection molding, the golf ball core is placed in a mold with retractable pins. The cover layer material is injected into the mold and surrounds the golf ball core. The pins are retracted at the appropriate time to avoid any defects in the cover layer.

In some embodiments, as discussed below with respect to performing step 202 and step 204 simultaneously, the at least one golf ball cover layer may be applied to the golf ball core through compression molding. The method used to apply the at least one cover layer to the golf ball core may be selected based on a variety of factors. For example, the method used to apply the at least one cover layer to the golf ball core may be selected based on the type of cover material used and/or the type of method used to form dimples on the outside of the cover layer.

In step 202, the coating may be optionally applied to the golf ball core by any suitable method. For example, in some embodiments, the coating may be applied to the at least one cover layer by spraying, rolling, painting and/or stamping. The method used to apply the coating to the at least one cover layer may be selected based on a variety of factors. For example, the method used to apply the coating to the at least one cover layer may be selected based on the type of coating material used and/or the type of cover material used.

In some embodiments, step 202 may be performed before step 204. In other embodiments, step 200 may be performed directly before step 204 is performed. In such embodiments, step 202 may be performed after step 204 and step 206. In some embodiments, step 202 and step 204 may be performed together simultaneously, as discussed in greater detail below.

When step 204 is performed after step 202, the entire finished golf ball may be heated during step 204. Thus, heating the golf ball core may entail heating the entire finished golf ball. When step 204 is performed after either step 200 or step 202, the golf ball core may be heated by any suitable method. For example, in some embodiments, heating the golf ball core may be performed by placing the golf ball core in an oven. In some embodiments, the golf ball core may be heated by placing the golf ball core in a heated liquid, such as oil. The temperature of the oven or the heated liquid may be hot enough to induce crosslinking in the golf ball core.

The temperature the golf ball core is heated to during step 204 may be high enough to induce crosslinking in the golf ball core. The temperature the golf ball core is heated to during step 204 may be selected based upon the desired hardness of the golf ball core and/or other factors. The method used to heat the golf ball core may be selected based on a variety of factors. For example, in some embodiments, the method used to heat the golf ball core may be selected based on whether the golf ball core is heated before, during or after the golf ball core has been incorporated into a finished golf ball. In some embodiments, the method used to heat the golf ball core may be selected based on equipment available to the person heating the golf ball core.

As stated above, some embodiments may include performing step 202 and step 204 simultaneously. For example, applying at least one cover layer to the golf ball core may be carried out through compression molding. Compression molding involves using a mold to heat and press the cover layer onto the golf ball core. While heating the cover layer to the golf ball core, the golf ball core may absorb the heat applied to the cover layer. As a result, the golf ball core may begin to cure from the outermost surface toward the center of the golf ball core.

Step 206 may include rapidly quenching the golf ball core to halt the curing of the golf ball core. Step 206 may include any suitable quenching method. For example, in some embodiments, step 206 may include quenching the golf ball core in a bath of ice and water, a water bath, a cryogenic fluid bath (e.g., liquid nitrogen), a dry ice/alcohol bath, or a cold chamber. In some embodiments, the same fluids may be poured over the finished golf ball. In some embodiments, the golf ball core is placed in a cold chamber to be quenched by convection cooling. The method of quenching the golf ball core may be selected based on a variety of factors. For example, the method of quenching the golf ball core may be selected based on the desired thickness of the cured portion of the golf ball core and/or the desired degree of crosslinking.

Figure 3:
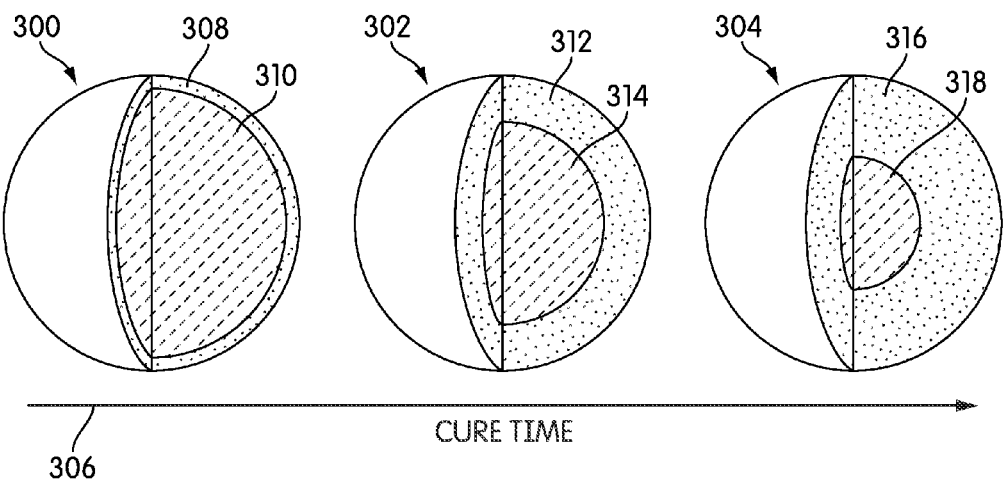
FIG. 3 shows three golf ball cores cured outer layers that vary in thickness as a function of cure time.
Figure 4:
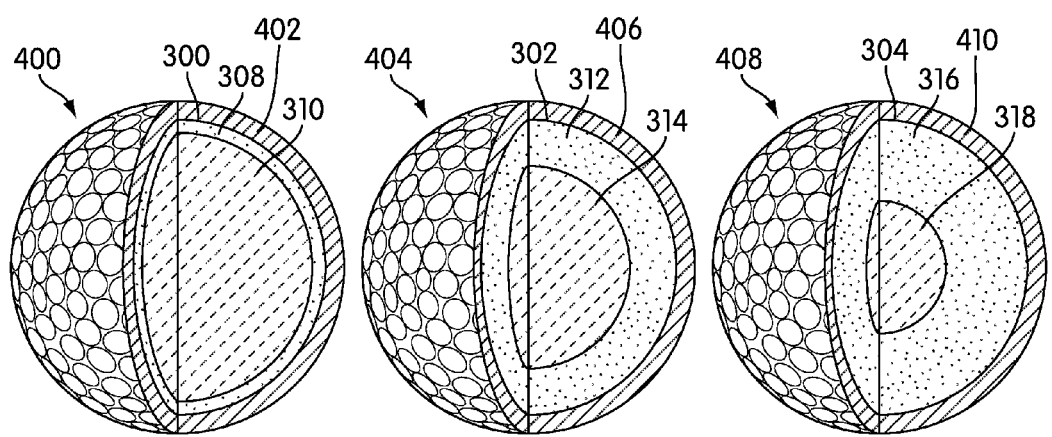
FIG. 4 is the three golf ball cores of FIG. 3 incorporated into finished golf balls.

By rapidly quenching the golf ball core, the interior of the golf ball core may be prevented from heating up enough to initiate a crosslinking reaction. As a result, the inner core zone may be left uncured. FIGS. 3 and 4 illustrate how heating the golf ball core and rapidly quenching a golf ball core partway through a curing process may produce a golf ball core having multiple distinct regions. FIG. 3 shows the golf ball cores with an outer core zone and an inner core zone. FIG. 4 shows finished golf balls having the golf ball cores of FIG. 3 with a cover layer.

Golf ball 400 may include a golf ball core 300 and a cover layer 402. Golf ball core 300 may include an outer core zone 308 and an inner core zone 310. Golf ball 404 may include a golf ball core 302 and a cover layer 406. Golf ball core 302 may include an outer core zone 312 and an inner core zone 314. Golf ball 408 may include a golf ball core 304 and a cover layer 410. Golf ball core 304 may include an outer core zone 316 and an inner core zone 318. The outer core zone of each golf ball core may make up a cured region of the core. The inner core zone of each golf ball core may make up an uncured region of the core.

While the golf ball cores in the embodiment in FIGS. 3 and 4 are shown with two distinct core zones, the golf ball cores may include more than two distinct core zones. To achieve more than two distinct core zones, step 204 and 206 may be repeated to form the desired number of core zones. The number of distinct core zones may be selected based on a variety of factors. For example, the number of distinct core zones may be selected based on the desired coefficient of restitution.

As indicated by the cure time line 306 in FIG. 3, the cured region of the golf ball core may increase as the golf ball core is exposed to heat. For example, golf ball core 302 may be exposed to heat longer than golf ball core 300. Thus, outer core zone 312 may be thicker than outer cure layer 308. Similarly, golf ball core 304 may be exposed to heat longer than golf ball core 302. As a result, outer core zone 316 may be thicker than outer core zone 312.

In some embodiments, a golf ball may include a golf ball core having more than two core zones. For example, the golf ball core may have three or more core zones as fully described in U.S. Provisional Application No. 61/605,070, entitled Golf Ball Core and Method of Making A Golf Ball Core, by inventors Aaron Bender and Arthur Molinari, and filed on Feb. 29, 2012, the disclosure of which is hereby incorporated in its entirety. Further, the golf ball core may have different thicknesses for each core zone as fully described in U.S. patent application Ser. No. 13/341,374, entitled Method of Making a Golf Ball Core, by inventor Aaron Bender, and filed on Dec. 30, 2011, the disclosure of which is hereby incorporated in its entirety.

The core material used to make the golf ball core may include any suitable type of core material that may be crosslinked or cured (vulcanized). For example, in some embodiments, the golf ball core may be formed primarily of rubber, such as a diene-containing composition, or metallocene catalyzed polyolefin. The type of core material used to make the golf ball core may be selected based upon a variety of factors. For example, the golf ball core material may be selected based upon the desired coefficient of restitution.

The material for forming the golf ball core may include a thermoset material. In some embodiments, the thermoset material may be a rubber composition. In some embodiments, the base rubber of the rubber composition may include polybutadiene, polyisoprene, styrene-butadiene copolymers, metallocene catalyzed polyolefin, natural rubber, and combinations thereof. To increase the resiliency of the golf ball core, 1,4-cis-polybutadiene may be used as the base rubber of the rubber composition. Polybutadiene rubbers suitable for use in embodiments of the disclosure include LG BR1208, which is available from LG Chem, LTD, Korea.

However, the skilled practitioner recognizes that polybutadiene rubber is available in various versions, including high-cis (greater than about 92 percent cis structure, typically with less than about 4 percent trans and less than about 4 percent vinyl); low-cis (as little as about 35 percent cis structure) and vinyl, all of which structures is suitable in embodiments of the disclosure.

Typically, high-cis viscosity polybutadiene rubber is used in accordance with the disclosure herein. Polybutadiene having primarily trans structure is not an elastic product, but rather is a crystalline, plastic product. Therefore, polybutadiene comprising primarily trans structure typically is not used as a rubber (elastic) product and so would not be suitable for use in this disclosure, although small amounts of crystalline trans polybutadiene in elastomeric polybutadiene rubber are to be expected, and do not adversely affect the properties and characteristics of the elastic polybutadiene rubber product.

Additives, such as a crosslinking agent and a filler, may be added to the rubber composition. The suitable crosslinking agent can be selected from the group consisting of peroxide, zinc diacrylate, magnesium acrylate, zinc methacrylate, magnesium methacrylate, and combination thereof.

Typically, peroxide may be used as the cross-linking agent in the rubber composition. Organic peroxides suitable as free radical initiators include, for example, dicumyl peroxide (DCP); n-butyl-4,4-di(t-butylperoxy) valerate; 1,1-di(t-butylperoxy)3,3,5-trimethylcyclohexane (TMCH); 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof.

Co-agents can be used with peroxides to improve the cure of the rubber composition. Suitable co-agents include, for example, metal salts of unsaturated carboxylic acids having from 3 to 8 carbon atoms; unsaturated vinyl compounds and polyfunctional monomers (for example, trimethylolpropane trimethacrylate); phenylene bismaleimide; and combinations thereof. Particularly suitable metal salts include, for example, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the co-agent is zinc diacrylate (ZDA).

One or more suitable filler may be added in the rubber composition, such as zinc oxide, tungsten, barium sulfate, calcium carbonate, and magnesium carbonate. In the disclosed method, zinc oxide may be used as a filler.

In addition to the materials described above, the golf ball core material may include a pigment. The pigment may include a highly conjugated pigment. Highly conjugated pigments are generally compounds with alternating single and multiple bonds. The conjugated pigment may be cyclic, acyclic, linear or a combination thereof. When an electron in a conjugated pigment absorbs a photon of light of a specific wavelength, the electron is promoted to an excited state. Conjugated pigments of fewer than eight conjugated double bonds absorb photons of light only in the ultraviolet region and appear colorless to the human eye. With every conjugated double bond added to a conjugated pigment above eight conjugated multiple bonds, the conjugated pigment absorbs photons of longer wavelength making them visible to the human eye. Conjugated pigments with more than eight conjugated double bonds range from yellow to red in color.

Further, some conjugated pigments include a wide variety of colors. For example, azo pigments are available is a large spectrum of colors. As mentioned above, some conjugated pigments may appear yellow, orange, or red. Further, other conjugated pigments may appear blue or green. Some conjugated pigments that appear blue or green in color may not rely solely on the conjugated double bonds. The blue or green color of some conjugated pigments may be due to the inclusion of a metallic ion, such as magnesium or cobalt. The combination of the conjugated double bonds and the metallic ions provide the appearance of a blue or green color to the pigment. However, not all blue or green pigments require a metallic ion be present. For example, azulene is a blue pigment that does not have a metallic ion.

The highly conjugated pigment of the disclosure may include an azo pigment, diazo pigment, phthalocyanine pigment, porphyrin pigment, chromophore-containing compounds, and combinations thereof. For example, the highly conjugated pigment may be beta-carotene, lycopene, amphotericin B, Sudan black, aniline yellow, oil red O, chlorophyll A, azulene, phenol red, indigo, or erythrosine. The amount of pigment included in the rubber material of the cure indicator depends on the desired color. In addition, a combination of pigments may be added to the rubber material to achieve a desired color.

The color of the rubber material used may be selected based upon a variety of factors. The color of the starting rubber materials as well as the color of the pigments selected will provide the color of the rubber material of the cure indicator. For example, more pigment may be added to white rubber materials to achieve a red color. The amount of pigment added to the white rubber materials may be less to achieve an orange color. The highly conjugated pigment may be present in the rubber material ranging from 0.1 phr to 5 phr. For example, to achieve a red color where the rubber material is white, beta-carotene may be added to the rubber material in the amount of about 1 phr. Again, the amount of pigment included in the rubber material will depend on the color of the starting material, the color of the pigments, and the desired color for the uncured rubber. As shown above in Table 1, a wide variety of colors can be achieved.

Additional processing aids such as dispersants and activators may optionally be included in the golf ball core material. In particular, zinc stearate may be added as a processing aid (e.g., as an activator).

The materials discussed above may be used to form the golf ball core by the processes described in the disclosure. The golf ball core formed by the processed described in the disclosure is formed from a uniform rubber recipe. In other words, the golf ball core is a one-piece core made from a uniform rubber recipe. That same golf core is then heated, quenched, and heated again to provide two or more core zones with the same or different cure levels. The one-piece golf ball core described in the disclosure may exhibit the same or similar characteristics as a multi-piece golf ball core.

In some embodiments, the cure indicator provided to the consumer may be formed of the same material used to form the golf ball core. In some embodiments, the rubber material that forms the cure indicator may include a pigment. In other embodiments, only the rubber used to form the cure indicator includes the pigment. In some embodiments, the cure indicator may be in the form of any shape, including but not limited to, a square, rectangle, circle, hexagon, octagon, or triangle. In some embodiments, the cure indicator may also be in a non-uniform shape. In further embodiments, the cure indicator can be scrap material left from the formation of the golf ball core. In other embodiments, the cure indicator is encased in a transparent container. The transparent container may be formed from a material that has a melting point higher than the temperatures achieved during step 106 shown in FIG. 1. In some embodiments, the transparent container is also microwave transparent.

In other embodiment, the cure indicator may provide a visual cue other than color change. In some embodiments, the cure indicator may display a temperature. The display may be the form of digital read-out or a temperature gauge, such as a thermometer.

The cure indicator is used in the disclosed method as an indicator for the level of cure achieved by the consumer when heating the finished golf ball. In some embodiments, the cure indicator may not have the mass or shape as the golf ball core. While the cure indicator may not have the same mass or shape as the golf ball core, the cure indicator correlates to the golf ball core with regard to the level of cure achieved during process 100 as shown in FIG. 1 and discussed above. In other words, the color of the cure indicator observed by the consumer during the heating step 106 correlated to the level of cure achieved in the golf ball core. During step 106, the cure level achieved for the cure indicator may be the same as the cure level achieved for the golf ball core. In some embodiment, the cure level achieved for the cure indicator may be different then the cure level achieved for the golf ball core achieved during process 100. Whether the cure level is the same or different, the color of the cure indicator achieved indicates the cure level achieved for the golf ball core.

Figure 5:
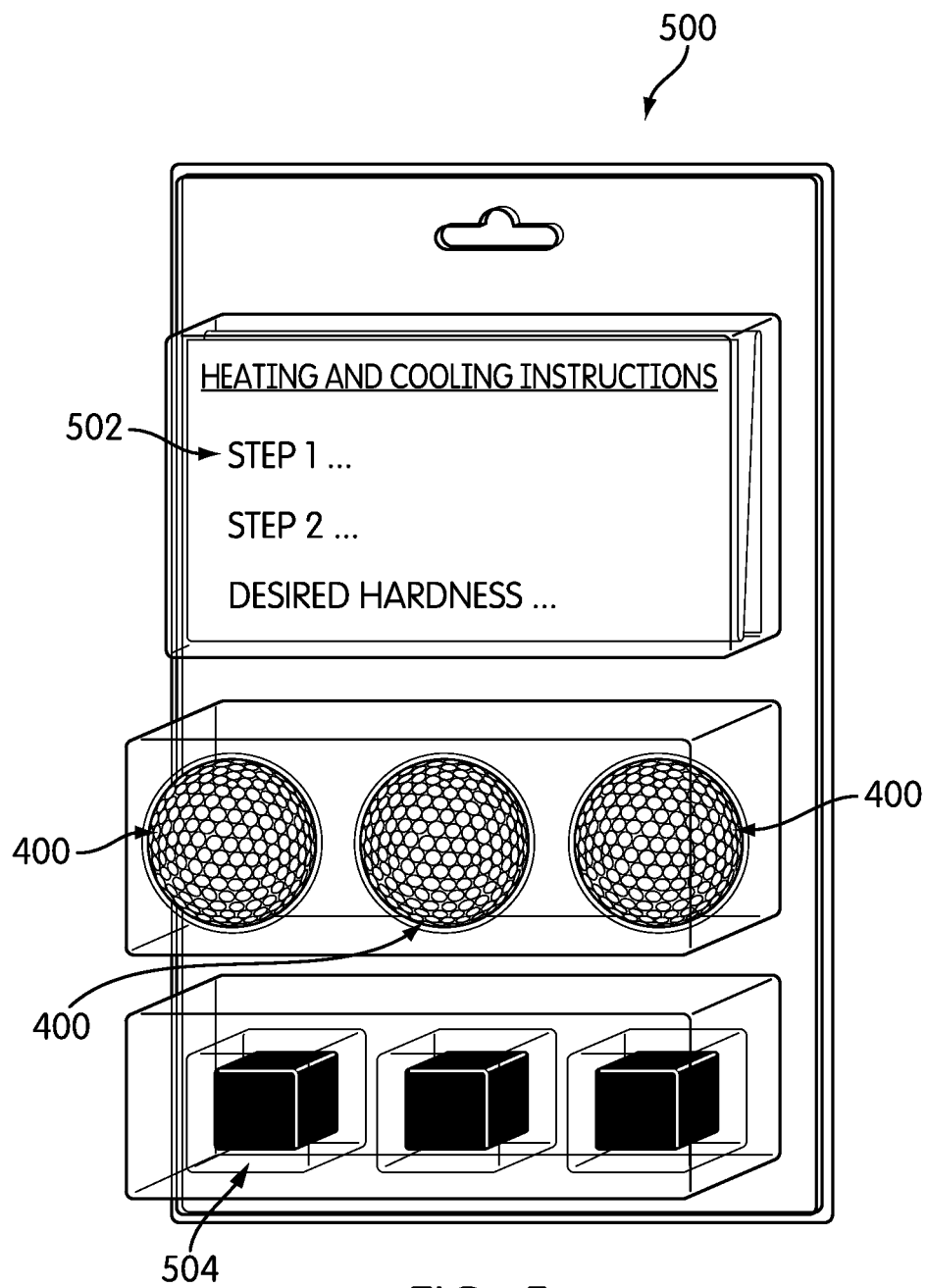
FIG. 5 is a kit that can be used to carry out an embodiment.

FIG. 5 shows an example of a kit 500 that may be used to carry out the method of the disclosure. Kit 500 may include at least one golf ball 400, discussed above, at least one cure indicator 504, and a set of instructions 502 for customizing the characteristics of the golf ball. In some embodiments, instructions 502 may include a graphical representation indicating to the end-user consumer to heat the golf ball and the cure indicator to a preselected temperature, and then quench the golf ball and cure indicator at a preselected rate so as to cause the golf ball to exhibit a desired play characteristic.

In some embodiments, instructions 502 may include a chart displaying which methods produce certain play characteristics. For example, FIG. 9 shows a chart 900 displaying methods of heating the finished golf ball and cure indicator, such as in step 106 discussed above, and quenching the finished golf ball and cure indicator, such as in step 108 discussed above, to achieve longer distance, more control, or most control. These heating processes and quenching processes are exemplary. In some embodiments, the heating process may include other types of heating, such as heating in an oven or a hot liquid bath. In some embodiments, the heating process may include heating the golf ball at a certain temperature. For example, in some embodiments, the golf ball may be heated in an oven preheated to 400° F. In some embodiments, the golf ball may be heated in an oven preheated to 460° F. In some embodiments, the heating process may include heating the golf ball for other lengths of time. For example, the golf ball may be heated in an oven for 20 minutes.

In some embodiments, chart 900 may include other types of quenching processes, such as quenching in a refrigerator, freezer, dry ice/alcohol bath, and/or a water bath. Similar to the heating processes, the quenching processes may include different times or temperatures. For example, a water bath may be cooled to a preselected temperature before the golf ball is quenched in the water bath.

The play characteristics listed in chart 900 are exemplary. In some embodiments, other play characteristics and/or ball characteristics may be listed in chart 900 instead of or in addition to the play characteristics shown in FIG. 9. For example, chart 900 may list ball hardness and/or ball feel.

In some embodiments, instructions 502 may include a chart displaying different colored cure indicators or a representation there that illustrate the level of cure necessary to achieve a golf ball with the desired play characteristics. For example, FIG. 10 shows chart 1000 displaying the color of the cure indicator for each cure level corresponding to specific play characteristics. The chart may display different colors for each cure level and/or a different number of colors for each cure level. The colors of the cure indicator and play characteristics listed in chart 1000 are exemplary. Other colors for the cure indicator, play characteristics and/or ball characteristics may be listed in chart 1000 instead of or in addition to the play characteristics shown in FIG. 10. For example, different pigments could be used to provide a different color gradient.

In some embodiments, a kit may include an additive that aids in the heating and/or quenching steps. The additive may be any substance that can be added to a heat exchange medium (such as warm or cold water) or to the golf ball itself, in order to improve an aspect of the heating or quenching step. The additive may be (for example) a water softener to remove salts from water that would otherwise negatively affect the golf ball by forming deposits thereon. The additive may also be, for example, an external microwave absorbing additive that is placed on the outside of the golf ball cover layer in order to aid in the absorption of microwaves when step 106 includes using a microwave. More generally, the additive may be (for example) a purified high specific heat liquid, such that a consumer may heat or quench the golf ball using the purified high specific heat liquid instead of water.

In some embodiments, a kit used to carry out the method of the disclosure may include a heater. For example, the kit may include the handheld clamp fully described in U.S. Patent Publication Number 2011/0095012, entitled Device for Heating a Golf Ball, and filed on Oct. 23, 2009, the disclosure of which is hereby incorporated in its entirety. In some embodiments, the kit may include a stand and a handheld clamp for holding the finished golf ball during customization as fully described in U.S. Patent Publication Number 2011/0177890, entitled Methods and Systems for Customizing a Golf Ball, and filed on Jan. 20, 2010, the disclosure of which is hereby incorporated in its entirety.

Accordingly, the present method and systems of kits allows aftermarket customization of a golf ball. An end-user, or other person, may perform the method on a golf ball so as to achieve a desired play characteristic, and thereby avoid the need to purchase multiple sets of golf balls having different inherent immutable play characteristics. From the perspective of a manufacturer, the method of providing a golf ball and indicating to the user allows the manufacturer to provide a superior system for customizing golf balls to their customers.

Figure 6:
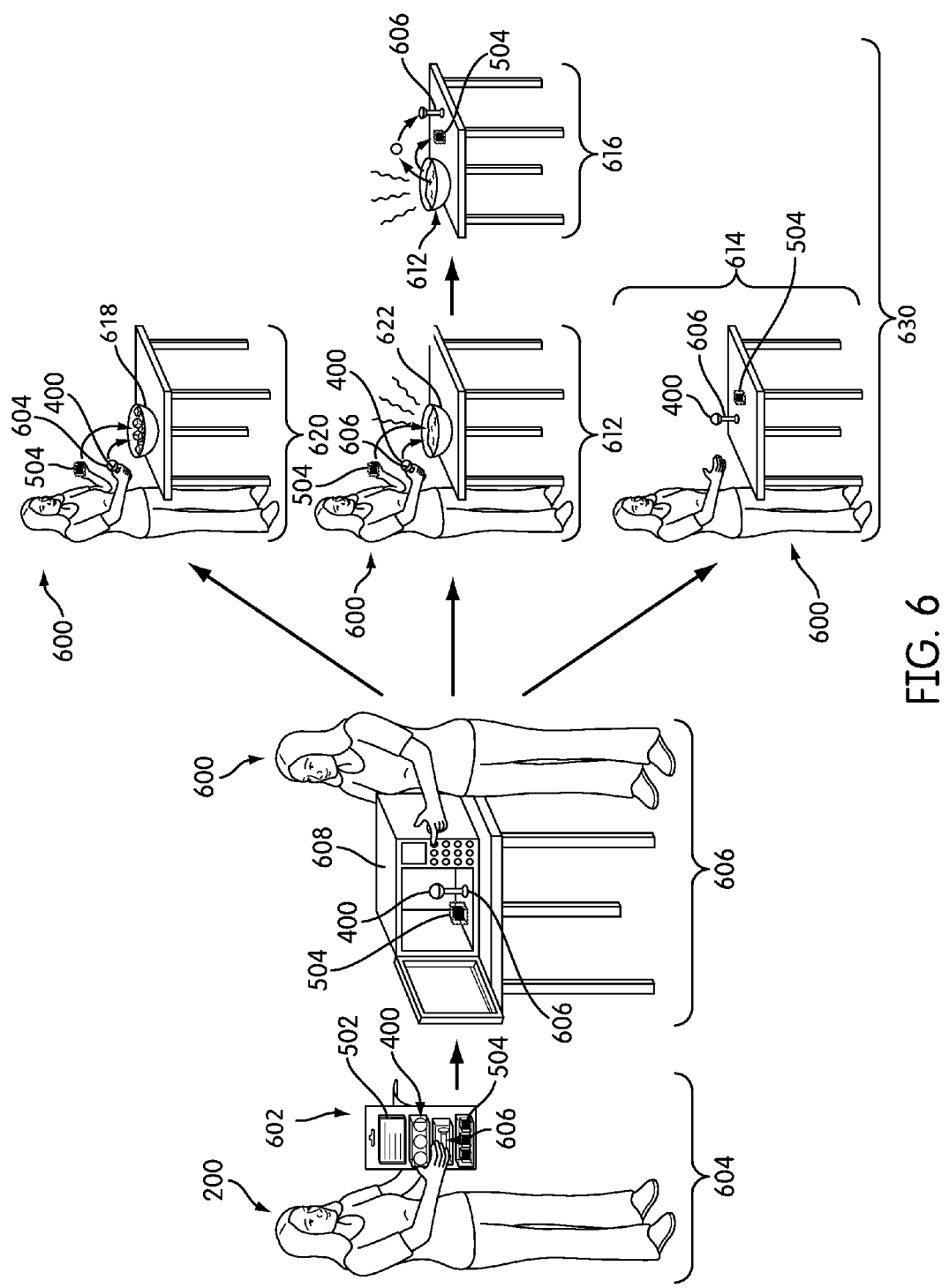
FIG. 6 shows an end-user consumer performing the disclosed method according to multiple embodiments.

FIG. 6 shows an end-user performing an embodiment of the method shown in FIGS. 1 and 2. Specifically, the end user 600 may receive a kit 602 in step 604. Kit 602 is similar to kit 500, discussed above, and may include at least one golf ball 400, at least one cure indicator 504, a set of instructions 502, and a stand 606 for holding golf ball 400. Instructions 502 may include the chart shown in FIG. 9. End-user 600 may consult instructions 502 when customizing the golf ball.

Next, in step 606, end-user 600 may heat golf ball 400 and cure indicator 504 to a preselected temperature using a microwave 608 by placing golf ball 400 on stand 606 and cure indicator 504 inside microwave 608. The end-user may choose a desired hardness and/or play characteristics and select the heating power and heating time. For example, in some embodiments, the end-user may choose from low, medium, and high microwave power settings. The end-user may also choose from among the following heating times: one minute, two minutes, three minutes, and four minutes. For example, an end-user may prefer a softer ball and may, therefore, choose to heat golf ball 400 for one minute on a medium power setting. In another example, the end-user may prefer a harder ball and may, therefore choose to heat golf ball 400 for three minutes on a high power setting.

In some embodiments, cover layer 402 of golf ball 400 may include a microwave transparent material. Generally, a microwave transparent material allows microwaves pass through the material. Using a microwave transparent material in cover layer 402 may ensure that the cover layer allows heat to pass through to the golf ball core.

After step 606, the end-user may choose a desired hardness and select one of three quenching paths in step 630. For example, if end user 600 desires a soft inner core zone, then the end-user may perform step 620 by quenching golf ball 400 in a cold water bath 618. In a particular embodiment, the cold water bath may have a temperature of between about 4° F. and about 13° F., and golf ball 400 may be quenched for a time period of from about one minute to about five minutes. However, a variety of alternative methods of quickly quenching the golf ball are within the scope of step 630, as are known in the art of heat exchangers. For example, step 630 may include quenching the golf ball core in a bath of ice and water, a water bath, a cryogenic fluid bath (e.g., liquid nitrogen), a dry ice/alcohol bath, or a cold chamber. In some embodiments, step 630 may include pouring fluids over the finished golf ball.

Alternatively, if end-user 600 desires a harder inner core zone on golf ball 400, in some embodiments, end-user 600 may perform steps 612 and 616 or step 614. In step 612, end-user 600 may quench golf ball 400 and cure indicator 504 in a warm water bath 622. The warm water bath 622 may have a temperature of between about 40° F. and about 70° F. Golf ball 400 and cure indicator 504 may be placed in warm water bath 622 for a time period of from about one minute to about ten minutes. Subsequently, in step 616, golf ball 400 and cure indicator 504 may be removed from warm water bath 622 and placed on stand 606 to air cool to room temperature. Golf ball 400 and cure indicator 504 may be allowed to slowly air cool, without an intermediate quenching step, as in step 614.

In some embodiments, end-user 600 may perform step 614 to quench golf ball 400 and cure indicator 504. In step 614, end-user 600 removes golf ball 400 on stand 606 and cure indicator 504 from microwave 608. Golf ball 400, stand 606 and cure indicator 504 are placed on a surface and exposed to the air to quench the golf ball core at ambient temperature.

Generally, FIG. 6 shows an embodiment of how an end-user may perform the step 106 and step 108 using readily available household equipment. However, each of steps 606, 620, 612, 614, and 616 are intended to broadly encompass any heat exchange process that heats or quenches the golf ball at the indicated rate so as to achieve the desired hardness. For example, the heating process may use a conventional oven, a hot liquid bath, or a hot air source. The use of readily available household equipment makes the process easy for an end-user consumer to perform. However, larger scale heat exchange systems may be used in other embodiments, such as when the method is performed in a golf pro-shop.

FIG. 7 illustrates golf ball 402, golf ball 404, and golf ball 408 after step 106 and step 108. Inner core 310, inner core 314, and inner core 316 may be cured after step 106 and step 108.

FIG. 8 illustrates an embodiment in which a golf ball 800 has a cover layer 840 and a core 860 including three distinct core zones. An outer core zone 830 may be developed during a first curing process. For example, step 204 and step 206 may be performed to develop outer core zone 830. A middle core zone 820 may be developed during a second curing process. For example, step 106 and step 108 may be performed a second time to develop middle core zone 820. And an inner core zone 810 may be developed during a third curing process. For example, step 106 and step 108 may be repeated to develop middle core zone 820. Further, step 106 and step 108 may be repeated one or more times to develop multiple core zones in the golf ball core. The number of times step 106 and step 108 are repeated may be selected based upon, for example, the desired number of core zones, the desired level of cure achieved, and/or the desired degree of crosslinking.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims. Further, any element of any embodiment described herein may be adapted for use in any other embodiment described herein, unless specifically limited in the disclosure.

What is claimed is:

1. A kit of parts, comprising:
    a golf ball including a cover layer surrounding a core made of rubber, the core having an outer thickness that is crosslinked rubber and an inner thickness that incorporates the center and is substantially uncrosslinked rubber that includes a crosslinking agent;
    a cure indicator;
    a set of instructions indicating to a consumer to:
        heat the golf ball and cure indicator until the cure indicator changes color to a preselected color, and then quench the golf ball so as to cause the golf ball to exhibit a desired play characteristic when hit with a golf club.

2. The kit of parts of claim 1, further comprising:
    a color gradient legend, wherein the cure indicator is made of rubber including a highly conjugated pigment that provides a first color to the rubber that corresponds with a first level of crosslinking of the rubber and the highly conjugated pigment provides a second color to the rubber that corresponds with a second level of crosslinking, wherein the color gradient displays the first color and the second color.

3. The kit of parts of claim 2, wherein the set of instructions further indicates to a consumer to select the desired play characteristics from the color gradient legend prior to heating the golf ball and cure indicator.

4. The kit of parts of claim 1, wherein the cure indicator is formed from the same type of rubber as the core and a pigment that provides a first color to the rubber that corresponds with a first level of crosslinking of the rubber, the pigment providing a second color to the rubber that corresponds with a second level of crosslinking.

5. The kit of parts of claim 1, wherein the golf ball core is formed from a rubber material, a free radical initiator, a co-agent, a filler, processing aids, and optionally a pigment.

6. The kit of parts of claim 1, wherein the cure indicator is formed from the same type of rubber as the golf ball core and the cure indicator includes a visual characteristic indicative of the level of crosslinking of the rubber.

7. The kit of parts of claim 6, wherein the cure indicator and the inner thickness of the core have the same level of crosslinking.

8. The kit of parts of claim 7, wherein the visual characteristic is color and the cure indicator includes a pigment that changes color according to the level of crosslinking of the rubber of the cure indicator.

9. The kit of parts of claim 8, wherein the pigment is a highly conjugated pigment is selected from the group consisting of an azo pigment, a diazo pigment, a phthalocyanine pigment, a porphyrin pigment, a chromophore-containing compound, and combinations thereof.

10. The kit of parts of claim 8, wherein the highly conjugated pigment is beta-carotene.

11. The kit of parts of claim 1, wherein the cure indicator is encased in a transparent container.

12. The kit of parts of claim 1, wherein the cure indicator is a rubber plaque.

* * * * *